US012669013B2

(12) United States Patent
Lin

(10) Patent No.: US 12,669,013 B2
(45) Date of Patent: Jun. 30, 2026

(54) DRIVE DEVICE FOR VERTICAL WINDOW BLIND

(71) Applicant: LIN GWO TSAIR ENTERPRISE CO., LTD., Tainan City (TW)

(72) Inventor: Yu-Hao Lin, Tainan City (TW)

(73) Assignee: LIN GWO TSAIR ENTERPRISE CO., LTD., Tainan City (TW)

( * ) Notice: Subject to any disclaimer, the term of this patent is extended or adjusted under 35 U.S.C. 154(b) by 234 days.

(21) Appl. No.: 18/540,266

(22) Filed: Dec. 14, 2023

(65) Prior Publication Data

US 2024/0240518 A1 Jul. 18, 2024

(30) Foreign Application Priority Data

Jan. 16, 2023 (TW) ................................ 112101739

(51) Int. Cl.
*E06B 9/36* (2006.01)

(52) U.S. Cl.
CPC .............. *E06B 9/368* (2013.01); *E06B 9/361* (2013.01)

(58) Field of Classification Search
CPC .......... E06B 9/361; E06B 9/364; E06B 9/388; E06B 9/322; E06B 2009/3222; E06B 2009/285; E05F 11/02; E05F 17/00
See application file for complete search history.

(56) References Cited

U.S. PATENT DOCUMENTS 3,463,219 A * 8/1969 Osterholz ............... E06B 9/368 160/172 R
3,789,905 A * 2/1974 Saito ....................... E06B 9/361 160/168.1 V
4,224,973 A * 9/1980 Hugin ..................... E06B 9/361 160/176.1 V
4,381,811 A * 5/1983 Frentzel .................. E06B 9/364 160/168.1 V
4,621,672 A * 11/1986 Hsu ......................... E06B 9/307 160/176.1 R
4,869,308 A * 9/1989 Chang ..................... E06B 9/307 160/176.1 R
5,266,068 A * 11/1993 Benthin .................... E06B 9/36 160/176.1 V
5,845,695 A * 12/1998 Cadorette ............... E06B 9/368 160/177 V
5,894,877 A * 4/1999 Sommerfeld ........... E06B 9/361 160/168.1 V
6,176,290 B1 * 1/2001 Hsu ......................... E06B 9/322 160/115
2009/0008046 A1 * 1/2009 Roetgering ............. E06B 9/322 160/321
2022/0349251 A1 * 11/2022 Qu .......................... E06B 9/368

FOREIGN PATENT DOCUMENTS

JP 08135345 A * 5/1996

* cited by examiner

*Primary Examiner* — Abe Massad
(74) *Attorney, Agent, or Firm* — Maschoff Brennan

(57) ABSTRACT

A drive device for a vertical window blind includes: a driving connecting rod, a driving screw rod and an open-and-close transmission rod connected with a slat open-and-close control screw of the vertical window blind, wherein the driving connecting rod drives the slat open-and-close control screw to axially rotate in the horizontal direction by the rotational driving force via the driving screw rod and the open-and-close transmission rod, thereby moving a plurality of slats slidably disposed on the slat open-and-close control screw in the horizontal direction.

7 Claims, 9 Drawing Sheets

DRIVE DEVICE FOR VERTICAL WINDOW BLIND

FIELD OF THE INVENTION

The present invention relates to a drive device for a window covering, and more particularly relates to a drive device for a vertical window blind.

BACKGROUND OF THE INVENTION

Window coverings are provided for blocking sunlight and for personal privacy. In addition, the window coverings also have environmental aesthetics, adjusting indoor light, sun protection and heat insulation, maintaining indoor temperature, sound absorption and other uses. In a common vertical window blind, a plurality of slats are arranged on a headrail track. Also, a blind string or a blind chain is used to slide and tilt the slats, thereby performing a light regulating operation and an open-and-close operation of the vertical window blind.

The blind string or the blind chain in a conventional vertical window blind generally has a considerable length, or even has its length to the ground in order to correspond to the height of the vertical window blind and operate easier. Therefore, children in the vicinity of the vertical window blind, who is curious and tries to pull the blind string or the blind chain to play, may be in danger of strangling and suffocating, thus having doubts about safety. In addition, the sliding and tilting of the slats need to be controlled by separate blind strings or blind chains, thus increasing the risk of strangulation and other safety risks.

SUMMARY OF THE INVENTION

Accordingly, one objective of the present invention is to provide a drive device for a vertical window blind to solve technical problems in a prior art.

In order to overcome the technical problems in the prior art, the present invention provides a drive device for a vertical window blind, comprising: a driving connecting rod having a receiving pin and a first connecting portion, the receiving pin being provided at one end of the driving connecting rod, and the first connecting portion being provided at the other end of the driving connecting rod, wherein the receiving pin is used to receive a window blind operating device so as to axially rotate in a vertical direction by a rotational driving force from the window blind operating device; a driving screw rod having a second connecting portion and a driving screw gear, the second connecting portion being provided at one end of the driving screw rod, the driving screw gear being formed on a peripheral surface of the driving screw rod, wherein the second connecting portion of the driving screw rod is connected with the first connecting portion of the driving connecting rod so that the driving screw rod is driven by the driving connecting rod to axially rotate in the vertical direction; and an open-and-close transmission rod having an open-and-close transmission screw gear, wherein an open-and-close transmission output joint is provided at one end of the open-and-close transmission rod, the open-and-close transmission screw gear is formed on a peripheral surface of the open-and-close transmission rod, the open-and-close transmission screw gear is engaged with the driving screw gear in a manner that a vertically axial rotation is converted to a horizontally axial rotation so that the open-and-close transmission rod is driven by the driving screw rod to axially rotate in a horizontal direction, and the open-and-close transmission output joint is used for connecting with a slat open-and-close control screw of the vertical window blind to drive the slat open-and-close control screw to axially rotate in the horizontal direction, wherein the driving connecting rod drives the slat open-and-close control screw to axially rotate in the horizontal direction by the rotational driving force from the window blind operating device, and thereby the slat open-and-close control screw rotates to horizontally open or horizontally close a plurality of slats slidably disposed on the slat open-and-close control screw.

In one embodiment of the present invention, the drive device is provided, wherein the first connecting portion of the driving connecting rod is connected with the second connecting portion of the driving screw rod in a torque-limiting manner so that when the rotational driving force from the window blind operating device is greater than a preset torque value, the first connecting portion slips relative to the second connecting portion such that the driving screw rod is not driven to rotate by the driving connecting rod.

In one embodiment of the present invention, the drive device is provided, wherein the first connecting portion is provided with a connecting hole, the second connecting portion is provided with a connecting pin, and the first connecting portion is connected with the second connecting portion by inserting the connecting pin into the connecting hole.

In one embodiment of the present invention, the drive device is provided further comprising: an angle transmission rod having an angle transmission screw gear, an angle transmission output joint being provided at one end of the angle transmission rod, the angle transmission screw gear being formed on a peripheral surface of the angle transmission rod, the angle transmission screw gear being engaged with the driving screw gear in a manner that the vertically axial rotation is converted to the horizontally axial rotation so that the angle transmission rod is driven by the driving screw rod to axially rotate in the horizontal direction, and the angle transmission output joint being used for connecting with a slat angle control shaft of the vertical window blind to drive the slat angle control shaft to axially rotate in the horizontal direction, wherein the driving connecting rod drives the slat angle control shaft to axially rotate in the horizontal direction by the rotational driving force from the window blind operating device, and thereby the slat angle control shaft rotates to angle the slats.

In one embodiment of the present invention, the drive device is provided, wherein the open-and-close transmission output joint is connected with the open-and-close transmission rod via an open-and-close transmission clutch, and the angle transmission output joint is connected with the angle transmission rod via an angle transmission clutch, wherein when the open-and-close transmission clutch is in an engaged state, the open-and-close transmission output joint is engaged with the open-and-close transmission rod and axially rotates in the horizontal direction along with the open-and-close transmission rod, and when the open-and-close transmission clutch is in a disengaged state, the open-and-close transmission output joint is disconnected from the open-and-close transmission rod and is not driven by the open-and-close transmission rod, wherein when the angle transmission clutch is in an engaged state, the angle transmission output joint is engaged with the angle transmission rod and axially rotates in the horizontal direction along with the angle transmission rod, and when the angle transmission clutch is in a disengaged state, the angle transmission output joint is disconnected from the angle transmission rod and is not driven by the angle transmission rod.

In one embodiment of the present invention, the drive device is provided further comprising: a clutch switching component, which is connected with the open-and-close transmission clutch and the angle transmission clutch to control the open-and-close transmission clutch and the angle transmission clutch to be switched between the engaged state and the disengaged state, and is configured to switch between a first switching position and a second switching position, wherein in the first switching position, the clutch switching component switches the open-and-close transmission clutch to the engaged state and switches the angle transmission clutch to the disengaged state, and in the second switching position, the clutch switching component switches the open-and-close transmission clutch to the disengaged state and switches the angle transmission clutch to the engaged state.

In one embodiment of the present invention, the drive device is provided, wherein the open-and-close transmission clutch includes an open-and-close transmission teeth portion, an open-and-close transmission clutch teeth portion and an open-and-close transmission elastic element, the open-and-close transmission teeth portion is provided at one end of the open-and-close transmission rod, the open-and-close transmission clutch teeth portion is connected with the open-and-close transmission output joint by the open-and-close transmission elastic element, and the open-and-close transmission elastic element biases the open-and-close transmission clutch teeth portion so that the open-and-close transmission clutch teeth portion is engaged with the open-and-close transmission teeth portion, and thereby the open-and-close transmission output joint axially rotates in the horizontal direction along with the open-and-close transmission rod, and wherein the angle transmission clutch includes an angle transmission teeth portion, an angle transmission clutch teeth portion and an angle transmission elastic element, the angle transmission teeth portion is provided at one end of the angle transmission rod, the angle transmission clutch teeth portion is connected with the angle transmission output joint by the angle transmission elastic element, and the angle transmission elastic element biases the angle transmission clutch teeth portion so that the angle transmission clutch teeth portion is engaged with the angle transmission teeth portion, and thereby the angle transmission output joint axially rotates in the horizontal direction along with the angle transmission rod.

In one embodiment of the present invention, the drive device is provided further comprising: a clutch switching component, which includes an open-and-close transmission clutch slider and an angle transmission clutch slider, wherein the open-and-close transmission clutch slider is connected with the open-and-close transmission clutch teeth portion to control the open-and-close transmission clutch to be switched between the engaged state and the disengaged state, the angle transmission clutch slider is connected with the angle transmission clutch teeth portion to control the angle transmission clutch to be switched between the engaged state and the disengaged state, and the clutch switching component is configured to switch between a first switching position and a second switching position, wherein in the first switching position, the open-and-close transmission clutch slider slides horizontally without resisting a biasing force of the open-and-close transmission elastic element so that the open-and-close transmission clutch teeth portion is engaged with the open-and-close transmission teeth portion, thereby switching the open-and-close transmission clutch to the engaged state, and at the same time, the angle transmission clutch slider slides horizontally while resisting a biasing force of the angle transmission elastic element so that the angle transmission clutch teeth portion is disengaged from the angle transmission teeth portion, thereby switching the angle transmission clutch to the disengaged state, and wherein in the second switching position, the open-and-close transmission clutch slider slides horizontally while resisting the biasing force of the open-and-close transmission elastic element so that the open-and-close transmission clutch teeth portion is disengaged from the open-and-close transmission teeth portion, thereby switching the open-and-close transmission clutch to the disengaged state, and at the same time, the angle transmission clutch slider slides horizontally without resisting the biasing force of the angle transmission elastic element so that the angle transmission clutch teeth portion is engaged with the angle transmission teeth portion, thereby switching the angle transmission clutch to the engaged state.

In one embodiment of the present invention, the drive device is provided, wherein the clutch switching component further has an interconnecting element connected with the driving connecting rod, the first connecting portion of the driving connecting rod is slidably connected with the second connecting portion of the driving screw rod so that the driving connecting rod is slidable in the vertical direction between a first vertical position and a second vertical position with respect to the driving screw rod, wherein as the driving connecting rod slides in the vertical direction to the first vertical position, the clutch switching component is driven by the driving connecting rod via the interconnecting element to switch to the first switching position, and as the driving connecting rod slides in the vertical direction to the second vertical position, the clutch switching component is driven by the driving connecting rod via the interconnecting element to switch to the second switching position.

In one embodiment of the present invention, the drive device is provided, wherein the blind operating device is a foldable crank.

With the technical means adopted by the present invention, the drive device of the present invention does not need to use the blind string or the blind chain. On the contrary, the present invention uses the driving connecting rod to receive the rotational driving force from the window blind operating device to drive the slat open-and-close control screw to axially rotate in the horizontal direction, and thereby the slat open-and-close control screw rotates to horizontally open or horizontally close the slats slidably disposed on the slat open-and-close control screw. On the other hand, the driving connecting rod can also receive the rotational driving force from the window blind operating device to drive the slat angle control shaft to axially rotate in the horizontal direction, and thereby the slat angle control shaft rotates to angle the slats, thus enhancing the safety of the window blind in use.

Furthermore, in the drive device of the present invention, since the clutch switching component is applied to switch the transmission of the rotational driving force, it is possible to control the opening and closing and the angle of the slats by a single window blind operating device, thus enhancing the convenience of operating the window blinds.

Moreover, in the drive device of the present invention, the first connecting portion of the driving connecting rod is connected with the second connecting portion of the driving screw rod in a torque-limiting manner so that when the rotational driving force from the window blind operating device is greater than a preset torque value, the first connecting portion slips relative to the second connecting portion such that the driving screw rod is not driven to rotate by the driving connecting rod. In this way, when the slats are fully open or close or the slats rotate to a threshold angle, the rotational driving force is no longer transmitted to the driving screw rod, and accordingly it avoids damage to the components due to excessive torque, thereby prolonging the service life of the drive device for the vertical window blind.

DETAILED DESCRIPTION OF THE PREFERRED EMBODIMENTS

Figure 1:
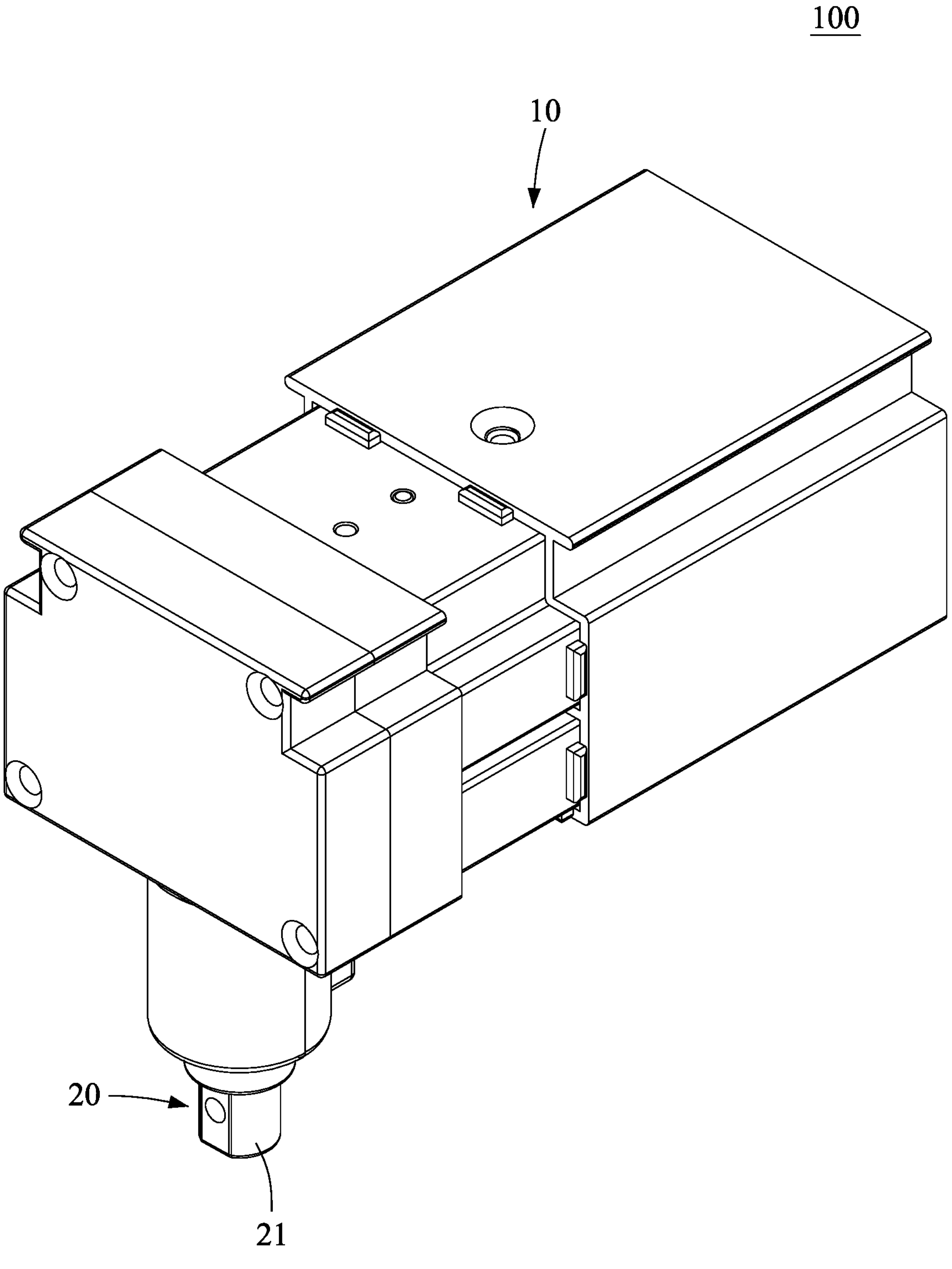
FIG. 1 is a schematic perspective view illustrating a drive device for a vertical window blind according to one embodiment of the present invention.
Figure 2:
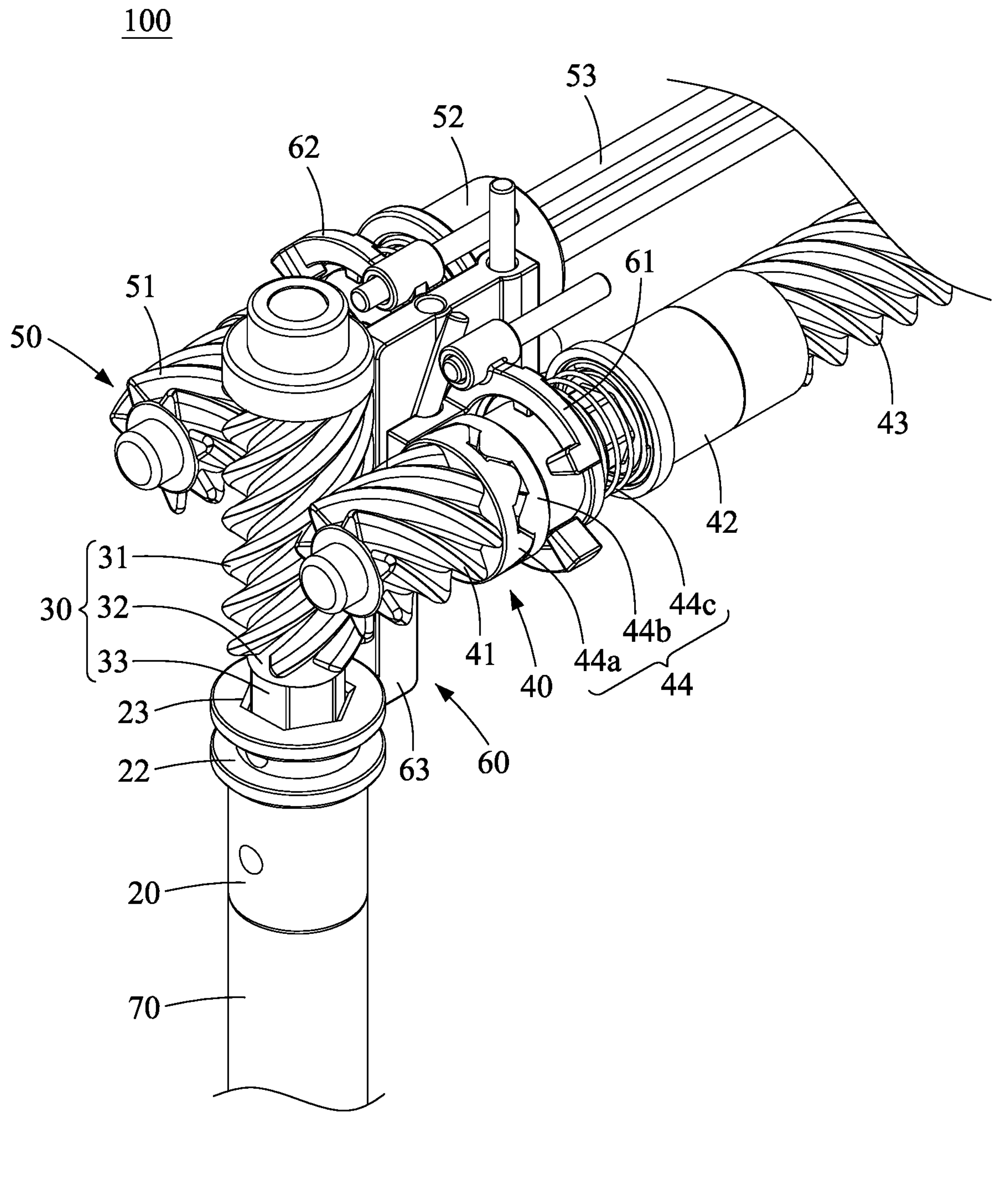
FIG. 2 is a schematic perspective view illustrating the internal structure of the drive device for the vertical window blind according to the embodiment of the present invention.

The preferred embodiments of the present invention are described in detail with reference to FIG. 1 to FIG. 9. The description is used for explaining the embodiments of the present invention only, but not for limiting the scope of the claims.

As shown in FIG. 1 to FIG. 8, a drive device 100 for a vertical window blind according to one embodiment of the present invention comprises: a housing 10, a driving connecting rod 20, a driving screw rod 30, an open-and-close transmission rod 40 and an angle transmission rod 50. The driving connecting rod 20, the driving screw rod 30, the open-and-close transmission rod 40 and the angle transmission rod 50 are disposed in the housing 10. The housing 10 is used to be connected to a headrail track of the vertical window blind (not shown).

As shown in FIG. 2 to FIG. 8, the driving connecting rod 20 has a receiving pin 21 and a first connecting portion 22, the receiving pin 21 is provided at one end of the driving connecting rod 20, and the first connecting portion 22 is provided at the other end of the driving connecting rod 20, wherein the receiving pin 21 is used to receive a window blind operating device 70 so as to axially rotate in a vertical direction by a rotational driving force from the window blind operating device 70.

The driving screw rod 30 has a second connecting portion 32 and a driving screw gear 31, the second connecting portion 32 is provided at one end of the driving screw rod 30, the driving screw gear 31 is formed on a peripheral surface of the driving screw rod 30, wherein the second connecting portion 32 of the driving screw rod 30 is connected with the first connecting portion 22 of the driving connecting rod 20 so that the driving screw rod 30 is driven by the driving connecting rod 20 to axially rotate in the vertical direction.

The open-and-close transmission rod 40 has an open-and-close transmission screw gear 41, wherein an open-and-close transmission output joint 42 is provided at one end of the open-and-close transmission rod 40, the open-and-close transmission screw gear 41 is formed on a peripheral surface of the open-and-close transmission rod 40, the open-and-close transmission screw gear 41 is engaged with the driving screw gear 31 in a manner that a vertically axial rotation is converted to a horizontally axial rotation so that the open-and-close transmission rod 40 is driven by the driving screw rod 30 to axially rotate in a horizontal direction, and the open-and-close transmission output joint 42 is used for connecting with a slat open-and-close control screw 43 of the vertical window blind to drive the slat open-and-close control screw 43 to axially rotate in the horizontal direction.

In the drive device 100 of this embodiment, the driving connecting rod 20 drives the slat open-and-close control screw 43 to axially rotate in the horizontal direction by the rotational driving force from the window blind operating device 70, and thereby the slat open-and-close control screw 43 rotates to horizontally open or horizontally close a plurality of slats slidably disposed on the slat open-and-close control screw 43.

The drive device 100 according to this embodiment does not need to use a blind string or a blind chain but the driving connecting rod 20 to receive the rotational driving force from the window blind operating device 70 to drive the slat open-and-close control screw 43 to axially rotate in the horizontal direction, and thereby the slat open-and-close control screw 43 rotates to horizontally open or horizontally close the slats slidably disposed on the slat open-and-close control screw 43, thus enhancing the safety of the window blind in use.

In this embodiment, the first connecting portion 22 of the driving connecting rod 20 is connected with the second connecting portion 32 of the driving screw rod 30 in a torque-limiting manner so that when the rotational driving force from the window blind operating device 70 is greater than a preset torque value, the first connecting portion 22 slips relative to the second connecting portion 32 such that the driving screw rod 30 is not driven to rotate by the driving connecting rod 20.

In this embodiment, the first connecting portion 22 is provided with a connecting hole 23, the second connecting portion 32 is provided with a connecting pin 33, and the first connecting portion 22 is connected with the second connecting portion 32 by inserting the connecting pin 33 into the connecting hole 23.

For example, the connecting hole 23 is formed as an internal hexagonal recess, the connecting pin 33 is formed as a hexagonal rod corresponding to the connecting hole 23, and an inner diameter of the connecting hole 23 is slight greater than an outer diameter of the connecting pin 33 in a manner that the connecting hole 23 slips and rotates relative to the connecting pin 33 when the rotational driving force is greater than the preset torque value.

In this way, when the slats are fully open or close or the slats rotate to a threshold angle, the rotational driving force is no longer transmitted to the driving screw rod to avoid damage to the components due to excessive torque, thereby prolonging the service life of the drive device for the vertical window blind.

Certainly, the present invention is not limited to this embodiment, and can provide a first connecting portion provided with a connecting pin and a second connecting portion provided with a connecting hole so that the first connecting portion is connected with the second connecting portion by inserting the connecting pin of the first connecting portion into the connecting hole of the second connecting portion.

As shown in FIG. 2 to FIG. 8, the drive device 100 according to the embodiment comprises an angle transmission rod 50.

The angle transmission rod 50 has an angle transmission screw gear 51, an angle transmission output joint 52 is provided at one end of the angle transmission rod 50.

The angle transmission screw gear 51 is formed on a peripheral surface of the angle transmission rod 50, the angle transmission screw gear 51 is engaged with the driving screw gear 31 in a manner that the vertically axial rotation is converted to the horizontally axial rotation so that the angle transmission rod 50 is driven by the driving screw rod 30 to axially rotate in the horizontal direction.

The angle transmission output joint 52 is used for connecting with a slat angle control shaft 53 of the vertical window blind to drive the slat angle control shaft 53 to axially rotate in the horizontal direction.

In the drive device 100 according to this embodiment, the driving connecting rod 20 drives the slat angle control shaft 53 to axially rotate in the horizontal direction by the rotational driving force from the window blind operating device 70, and thereby the slat angle control shaft 53 rotates to angle the slats.

The drive device 100 according to this embodiment does not need to use the blind string or the blind chain but the driving connecting rod 20 to receive the rotational driving force from the window blind operating device 70 to drive the slat angle control shaft 53 to axially rotate in the horizontal direction, and thereby the slat angle control shaft 53 rotates to angle the slats, thus enhancing the safety of the window blind in use.

As shown in FIG. 2 to FIG. 8, in this embodiment, the open-and-close transmission output joint 42 is connected with the open-and-close transmission rod 40 via an open-and-close transmission clutch 44, and the angle transmission output joint 52 is connected with the angle transmission rod 50 via an angle transmission clutch 54.

The open-and-close transmission clutch 44 includes an open-and-close transmission teeth portion 44*a*, an open-and-close transmission clutch teeth portion 44*b* and an open-and-close transmission elastic element 44*c*, the open-and-close transmission teeth portion 44*a* is provided at one end of the open-and-close transmission rod 40, the open-and-close transmission clutch teeth portion 44*b* is connected with the open-and-close transmission output joint 42 by the open-and-close transmission elastic element 44*c*, and the open-and-close transmission elastic element 44*c* biases the open-and-close transmission clutch teeth portion 44*b* so that the open-and-close transmission clutch teeth portion 44*b* is engaged with the open-and-close transmission teeth portion 44*a*, and thereby the open-and-close transmission output joint 42 axially rotates in the horizontal direction along with the open-and-close transmission rod 40.

The angle transmission clutch 54 includes an angle transmission teeth portion 54*a*, an angle transmission clutch teeth portion 54*b* and an angle transmission elastic element 54*c*, the angle transmission teeth portion 54*a* is provided at one end of the angle transmission rod 50, the angle transmission clutch teeth portion 54*b* is connected with the angle transmission output joint 52 by the angle transmission elastic element 54*c*, and the angle transmission elastic element 54*c* biases the angle transmission clutch teeth portion 54*b* so that the angle transmission clutch teeth portion 54*b* is engaged with the angle transmission teeth portion 54*a*, and thereby the angle transmission output joint 52 axially rotates in the horizontal direction along with the angle transmission rod 50.

In this embodiment, the open-and-close transmission elastic element 44*c* and the angle transmission elastic element 54*c* are coil springs. Needless to say, the present invention is not limited to this embodiment, and the open-and-close transmission elastic element 44*c* and the angle transmission elastic element 54*c* may be any kind of elastic element as long as it is possible to bias the open-and-close transmission clutch teeth portion 44*b* and the angle transmission clutch teeth portion 54*b* to engage the open-and-close transmission teeth portion 44*a* and the angle transmission teeth portion 54*a*, respectively.

Figure 3:
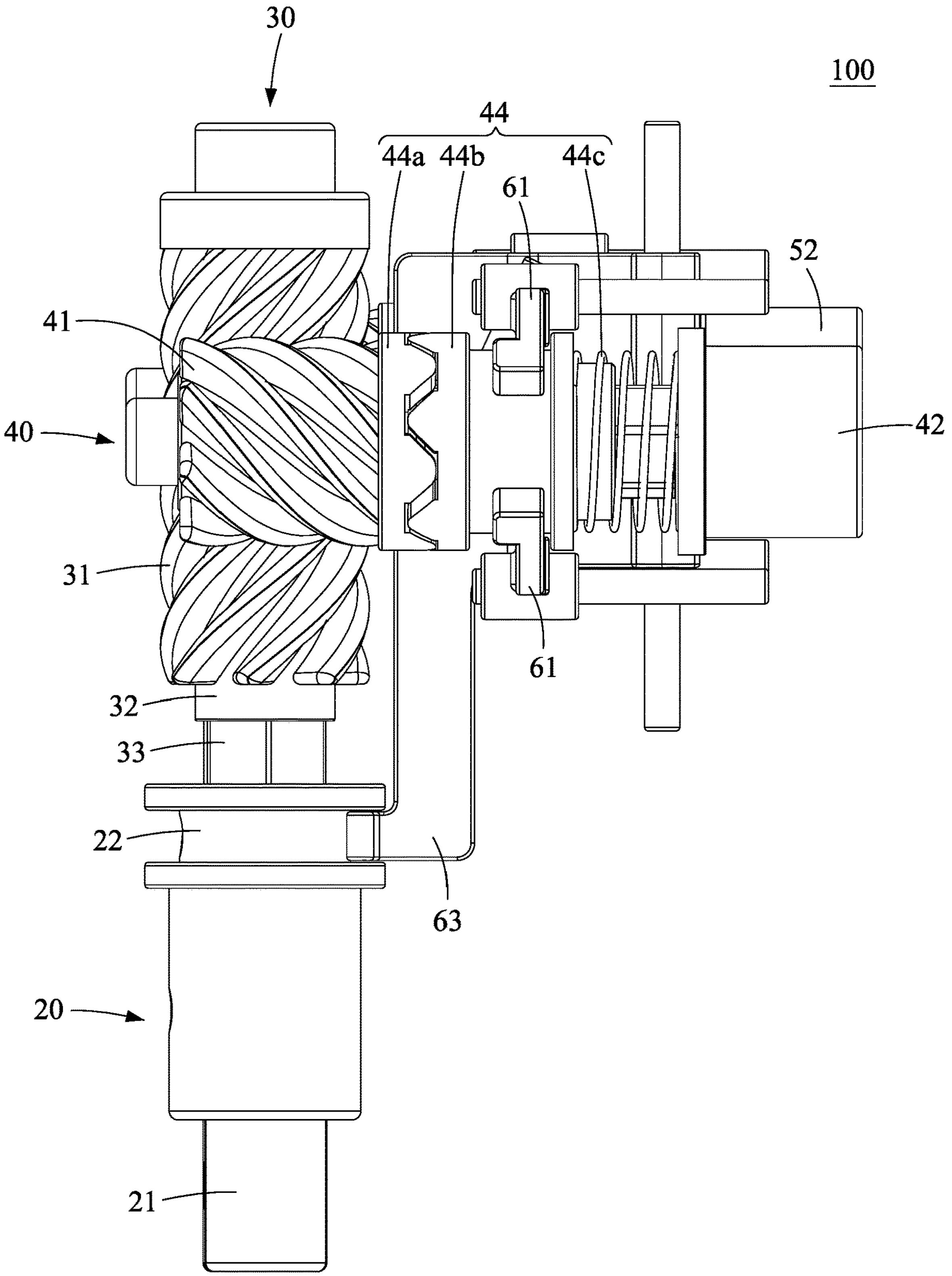
FIG. 3 is a schematic right side view illustrating the internal structure of the drive device for the vertical window blind according to the embodiment of the present invention.
Figure 4:
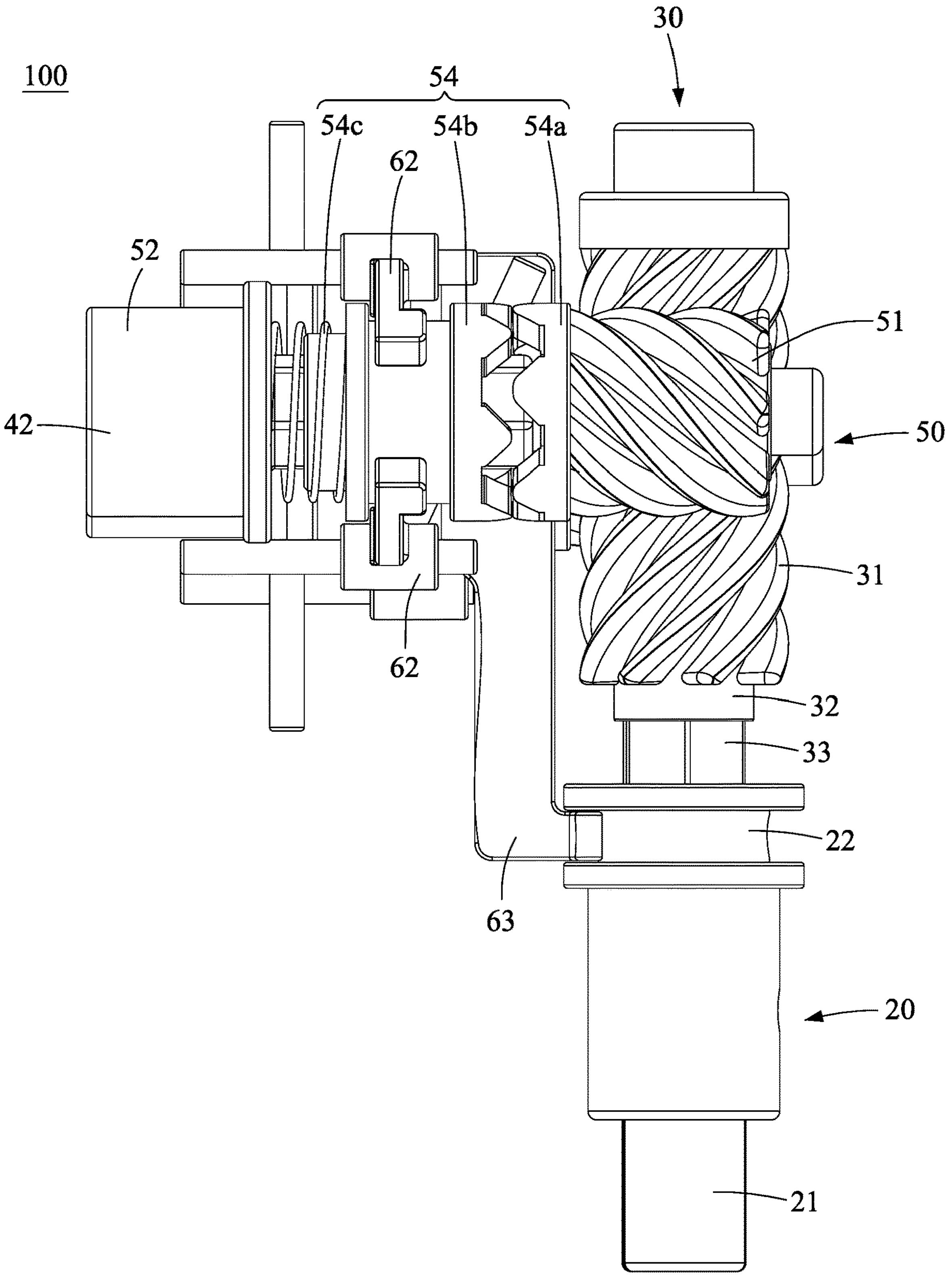
FIG. 4 is a schematic left side view illustrating the internal structure of the drive device for the vertical window blind according to the embodiment of the present invention.
Figure 5:
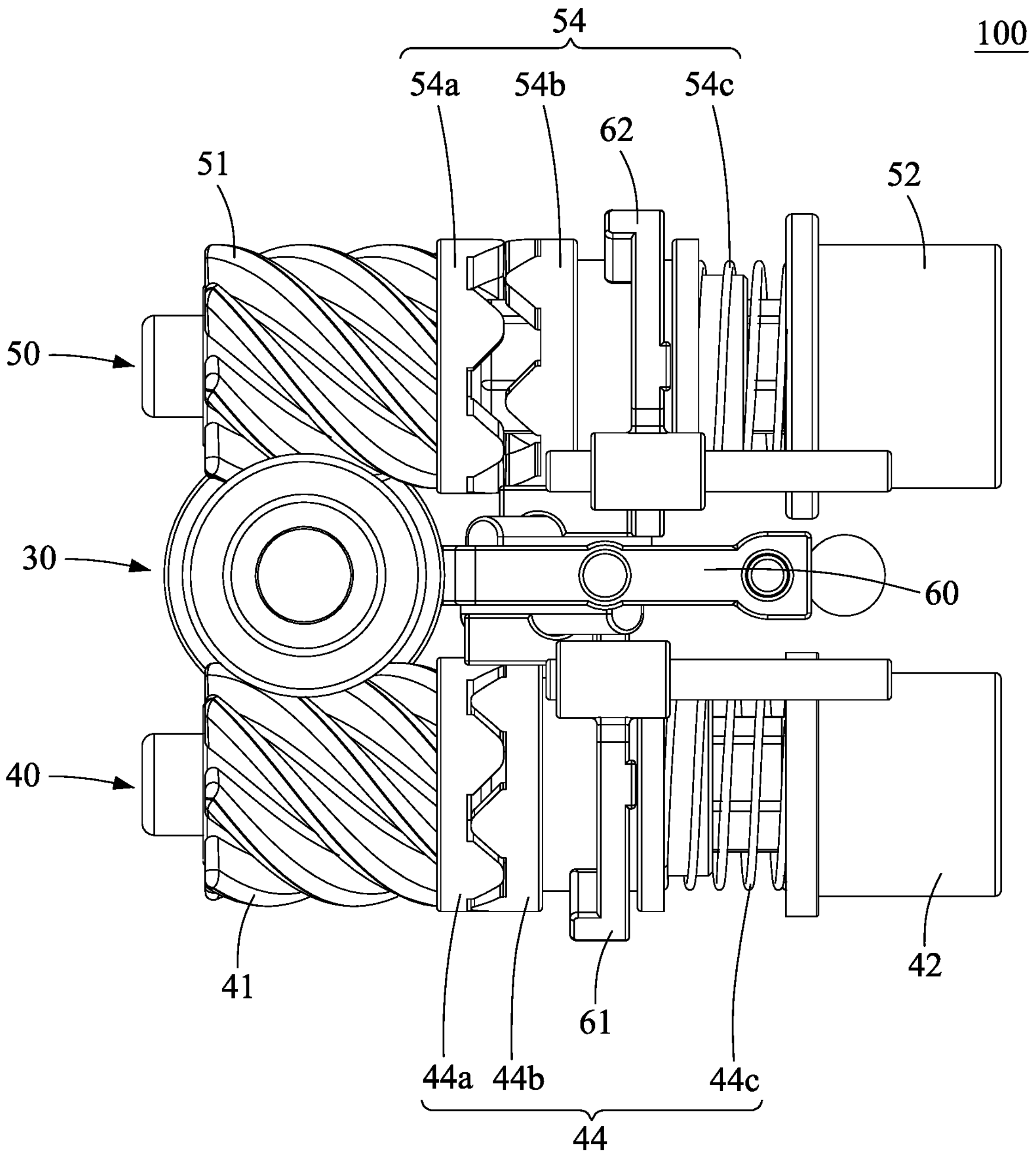
FIG. 5 is a schematic top view illustrating the internal structure of the drive device for the vertical window blind according to the embodiment of the present invention.

As shown in FIG. 3 to FIG. 5, when the open-and-close transmission clutch 44 is in an engaged state, the open-and-close transmission output joint 42 is engaged with the open-and-close transmission rod 40 and axially rotates in the horizontal direction along with the open-and-close transmission rod 40.

Figure 6:
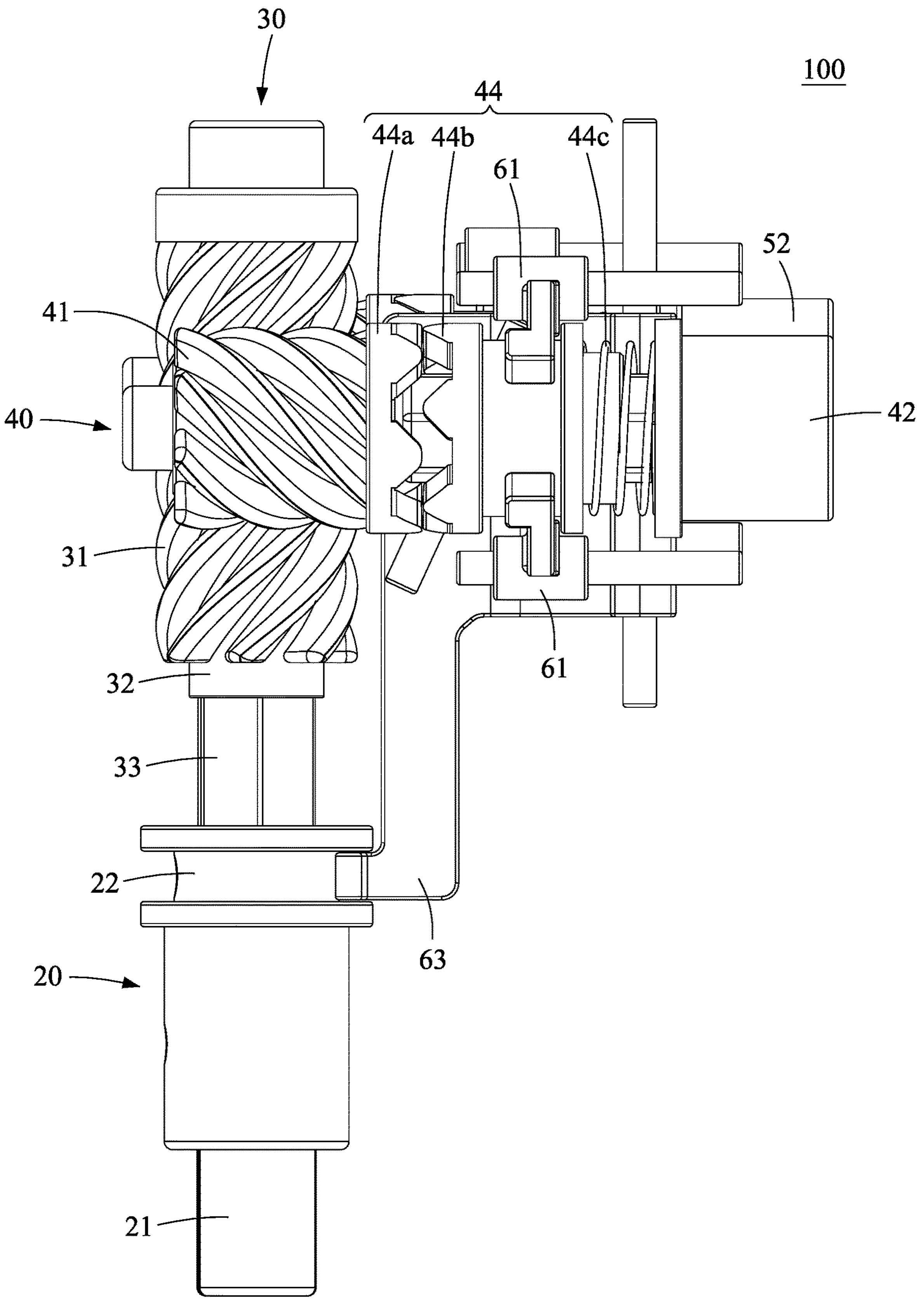
FIG. 6 is a schematic right side view illustrating the internal structure of the drive device for the vertical window blind according to the embodiment of the present invention.
Figure 7:
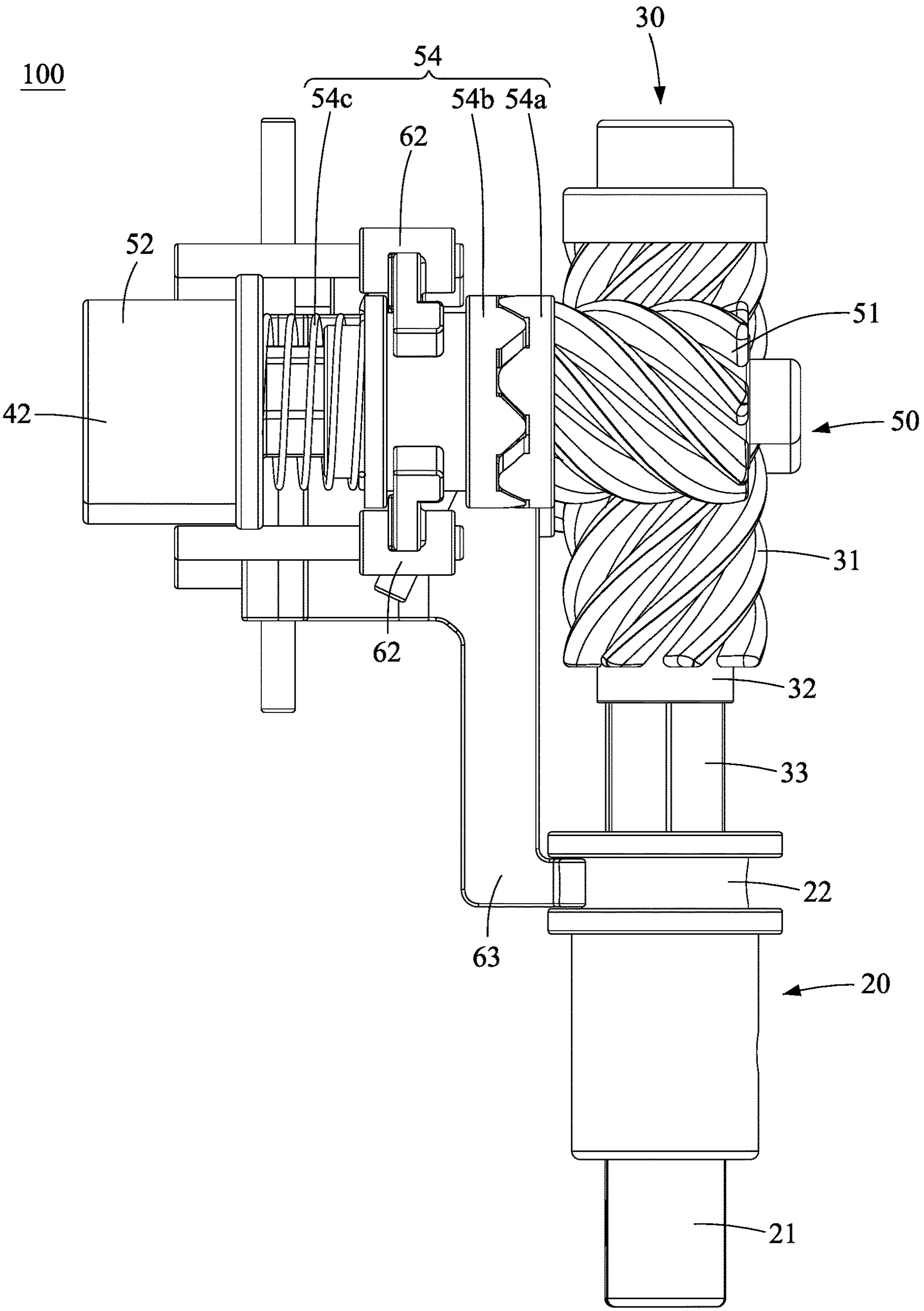
FIG. 7 is a schematic left side view illustrating the internal structure of the drive device for the vertical window blind according to the embodiment of the present invention.
Figure 8:
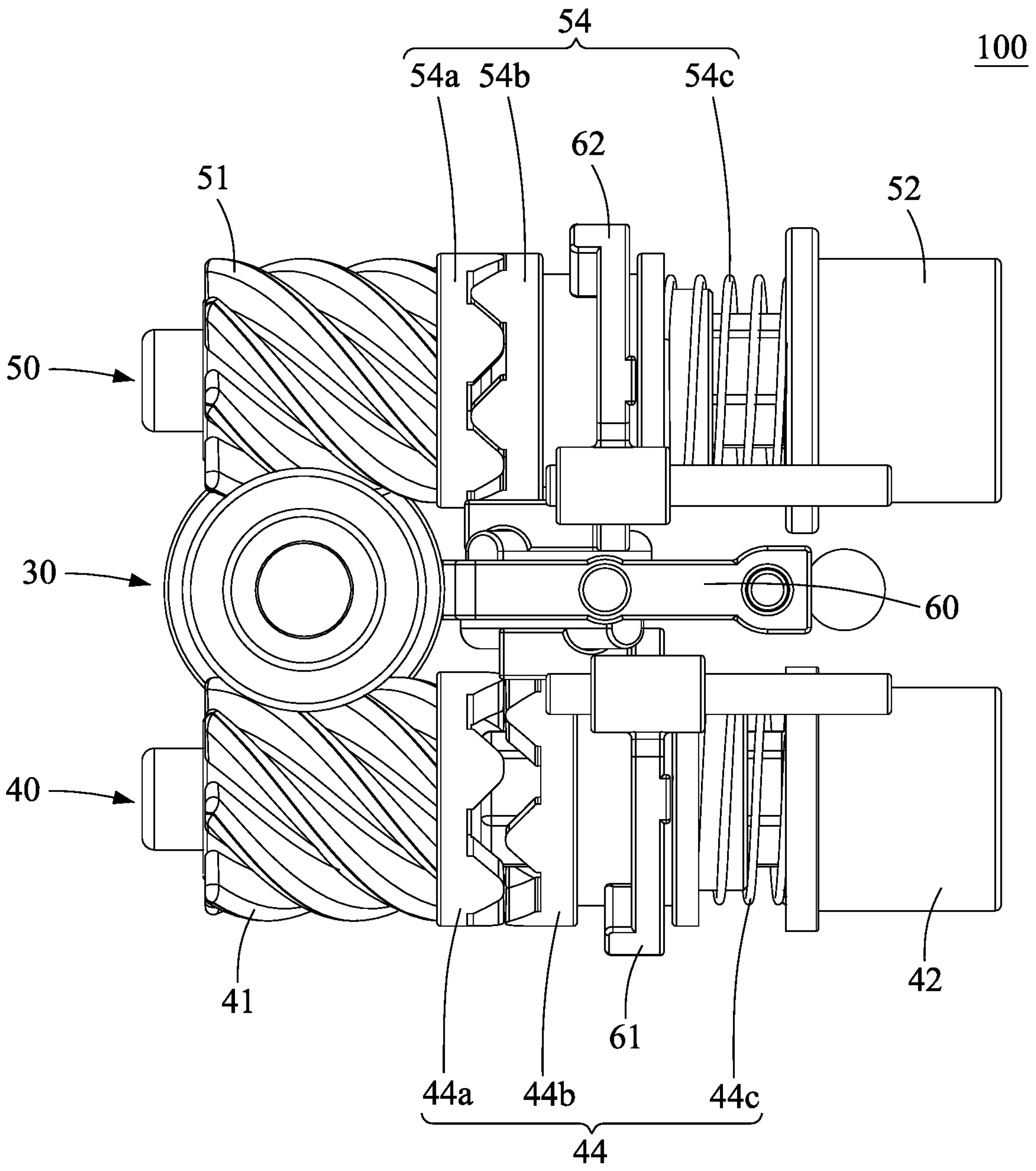
FIG. 8 is a schematic top view illustrating the internal structure of the drive device for the vertical window blind according to the embodiment of the present invention.

As shown in FIG. 6 to FIG. 8, when the open-and-close transmission clutch 44 is in a disengaged state, the open-and-close transmission output joint 42 is disconnected from the open-and-close transmission rod 40 and is not driven by the open-and-close transmission rod 40.

As shown in FIG. 6 to FIG. 8, when the angle transmission clutch 54 is in an engaged state, the angle transmission output joint 52 is engaged with the angle transmission rod 50 and axially rotates in the horizontal direction along with the angle transmission rod 50.

As shown in FIG. 3 to FIG. 5, when the angle transmission clutch 54 is in a disengaged state, the angle transmission output joint 52 is disconnected from the angle transmission rod 50 and is not driven by the angle transmission rod 50.

In this embodiment, the drive device 100 further comprises a clutch switching component 60, which includes an open-and-close transmission clutch slider 61 and an angle transmission clutch slider 62, and the clutch switching component 60 is configured to switch between a first switching position and a second switching position.

The open-and-close transmission clutch slider 61 is connected with the open-and-close transmission clutch teeth portion 44*b* to control the open-and-close transmission clutch 44 to be switched between the engaged state and the disengaged state, and the angle transmission clutch slider 62 is connected with the angle transmission clutch teeth portion 54*b* to control the angle transmission clutch 54 to be switched between the engaged state and the disengaged state.

As shown in FIG. 3 to FIG. 5, when the clutch switching component 60 is in the first switching position, the open-and-close transmission clutch slider 61 slides horizontally without resisting a biasing force of the open-and-close transmission elastic element 44*c* so that the open-and-close transmission clutch teeth portion 44*b* is engaged with the open-and-close transmission teeth portion 44*a*, thereby switching the open-and-close transmission clutch 44 to the engaged state, and at the same time, the angle transmission clutch slider 62 slides horizontally while resisting a biasing force of the angle transmission elastic element 54*c* so that the angle transmission clutch teeth portion 54*b* is disengaged from the angle transmission teeth portion 54*a*, thereby switching the angle transmission clutch 54 to the disengaged state.

As shown in FIG. 6 to FIG. 8, when the clutch switching component 60 is in the second switching position, the open-and-close transmission clutch slider 61 slides horizontally while resisting the biasing force of the open-and-close transmission elastic element 44*c* so that the open-and-close transmission clutch teeth portion 44*b* is disengaged from the open-and-close transmission teeth portion 44*a*, thereby switching the open-and-close transmission clutch 44 to the disengaged state, and at the same time, the angle transmission clutch slider 62 slides horizontally without resisting the biasing force of the angle transmission elastic element 54*c* so that the angle transmission clutch teeth portion 54*b* is engaged with the angle transmission teeth portion 54*a*, thereby switching the angle transmission clutch 54 to the engaged state.

As shown in FIG. 1 to FIG. 8, in this embodiment, the clutch switching component 60 further has an interconnecting element 63 connected with the driving connecting rod 20, the connecting hole 23 of the driving connecting rod 20 is slidably connected with the connecting pin 33 of the driving screw rod 30 so that the driving connecting rod 20 is slidable in the vertical direction between a first vertical position and a second vertical position with respect to the driving screw rod 30.

In this embodiment, as the driving connecting rod 20 slides in the vertical direction to the first vertical position, the clutch switching component 60 is driven by the driving connecting rod 20 via the interconnecting element 63 to switch to the first switching position, and as the driving connecting rod 20 slides in the vertical direction to the second vertical position, the clutch switching component 60 is driven by the driving connecting rod 20 via the interconnecting element 63 to switch to the second switching position.

With the above structure, in the drive device 100, by switching the transmission of the rotational driving force by the clutch switching component 60, it is possible to control the opening and closing and the angle of the slats by a single window blind operating device 70, thus enhancing the convenience of operating the window blinds.

Figure 9:
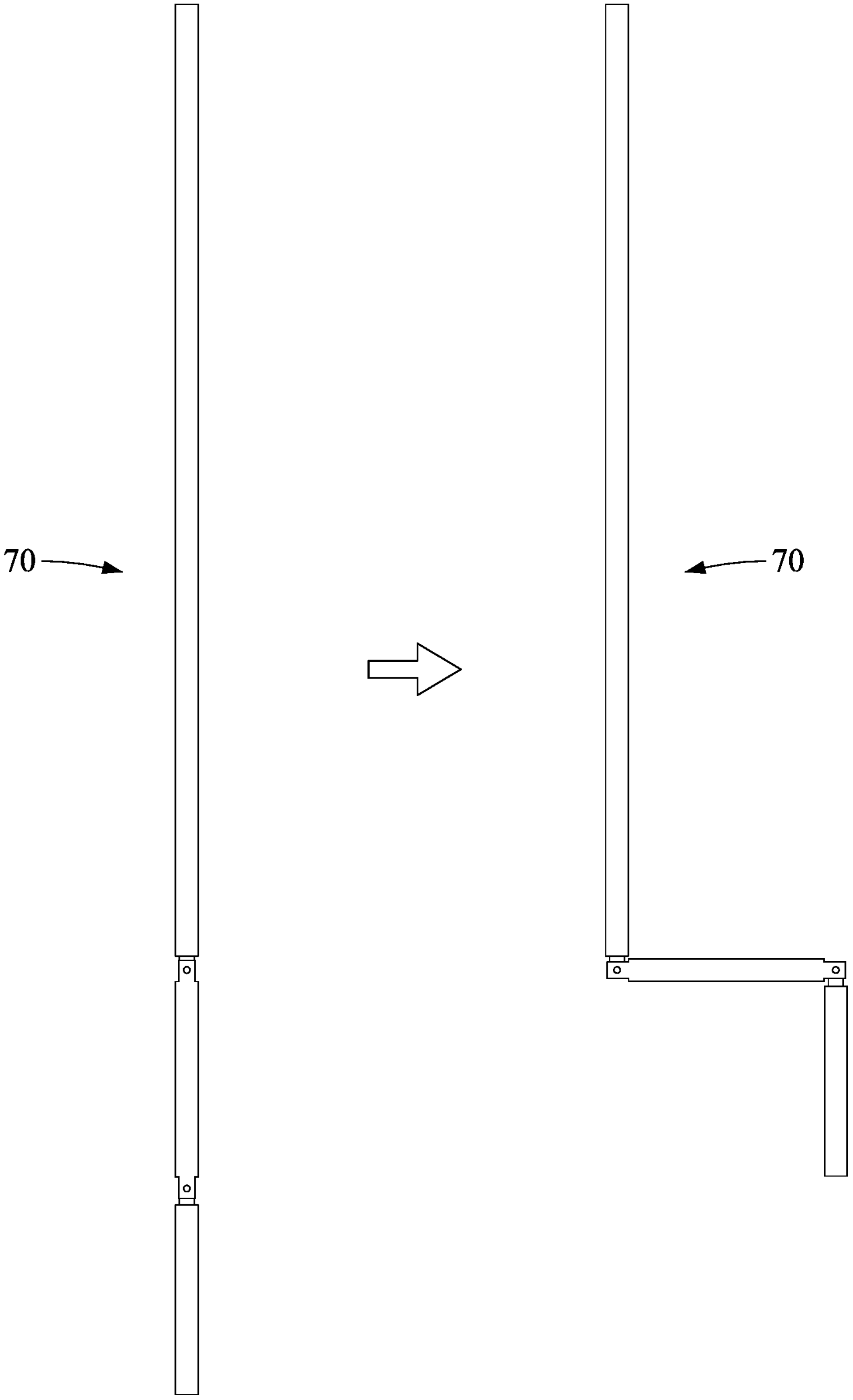
FIG. 9 is a schematic drawing illustrating a window blind operating device of the drive device for the vertical window blind according to the embodiment of the present invention.

As shown in FIG. 9, in this embodiment, the blind operating device 70 is a foldable crank, which can enhance the convenience of storage.

The above description should be considered as only the discussion of the preferred embodiments of the present invention. However, a person having ordinary skill in the art may make various modifications without deviating from the present invention. Those modifications still fall within the scope of the present invention.

What is claimed is:

1. A drive device for a vertical window blind, comprising:

a driving connecting rod having a receiving pin and a first connecting portion, the receiving pin being provided at one end of the driving connecting rod, and the first connecting portion being provided at the other end of the driving connecting rod, wherein the receiving pin is used to receive a window blind operating device so as to axially rotate in a vertical direction by a rotational driving force from the window blind operating device;

a driving screw rod having a second connecting portion and a driving screw gear, the second connecting portion being provided at one end of the driving screw rod, the driving screw gear being formed on a peripheral surface of the driving screw rod, wherein the second connecting portion of the driving screw rod is connected with the first connecting portion of the driving connecting rod so that the driving screw rod is driven by the driving connecting rod to axially rotate in the vertical direction; and an open-and-close transmission rod having an open-and-close transmission screw gear, wherein an open-and-close transmission output joint is provided at one end of the open-and-close transmission rod, the open-and-close transmission screw gear is formed on a peripheral surface of the open-and-close transmission rod, the open-and-close transmission screw gear is engaged with the driving screw gear in a manner that a vertically axial rotation is converted to a horizontally axial rotation so that the open-and-close transmission rod is driven by the driving screw rod to axially rotate in a horizontal direction, and the open-and-close transmission output joint is used for connecting with a slat open-and-close control screw of the vertical window blind to drive the slat open-and-close control screw to axially rotate in the horizontal direction, wherein the driving connecting rod drives the slat open-and-close control screw to axially rotate in the horizontal direction by the rotational driving force from the window blind operating device, and thereby the slat open-and-close control screw rotates to horizontally open or horizontally close a plurality of slats slidably disposed on the slat open-and-close control screw, wherein the drive device further comprises: an angle transmission rod having an angle transmission screw gear, an angle transmission output joint being provided at one end of the angle transmission rod, the angle transmission screw gear being formed on a peripheral surface of the angle transmission rod, the angle transmission screw gear being engaged with the driving screw gear in a manner that the vertically axial rotation is converted to the horizontally axial rotation so that the angle transmission rod is driven by the driving screw rod to axially rotate in the horizontal direction, and the angle transmission output joint being used for connecting with a slat angle control shaft of the vertical window blind to drive the slat angle control shaft to axially rotate in the horizontal direction, wherein the driving connecting rod drives the slat angle control shaft to axially rotate in the horizontal direction by the rotational driving force from the window blind operating device, and thereby the slat angle control shaft rotates to angle the slats, wherein the open-and-close transmission output joint is connected with the open-and-close transmission rod via an open-and-close transmission clutch, and the angle transmission output joint is connected with the angle transmission rod via an angle transmission clutch, wherein when the open-and-close transmission clutch is in an engaged state, the open-and-close transmission output joint is engaged with the open-and-close transmission rod and axially rotates in the horizontal direction along with the open-and-close transmission rod, and when the open-and-close transmission clutch is in a disengaged state, the open-and-close transmission output joint is disconnected from the open-and-close transmission rod and is not driven by the open-and-close transmission rod, wherein when the angle transmission clutch is in an engaged state, the angle transmission output joint is engaged with the angle transmission rod and axially rotates in the horizontal direction along with the angle transmission rod, and when the angle transmission clutch is in a disengaged state, the angle transmission output joint is disconnected from the angle transmission rod and is not driven by the angle transmission rod, and wherein the drive device further comprises: a clutch switching component, which is connected with the open-and-close transmission clutch and the angle transmission clutch to control the open-and-close transmission clutch and the angle transmission clutch to be switched between the engaged state and the disengaged state, and is configured to switch between a first switching position and a second switching position, wherein in the first switching position, the clutch switching component switches the open-and-close transmission clutch to the engaged state and switches the angle transmission clutch to the disengaged state, and in the second switching position, the clutch switching component switches the open-and-close transmission clutch to the disengaged state and switches the angle transmission clutch to the engaged state.

2. The drive device as claimed in claim 1, wherein the first connecting portion of the driving connecting rod is connected with the second connecting portion of the driving screw rod in a torque-limiting manner so that when the rotational driving force from the window blind operating device is greater than a preset torque value, the first connecting portion slips relative to the second connecting portion such that the driving screw rod is not driven to rotate by the driving connecting rod.

3. The drive device as claimed in claim 2, wherein the first connecting portion is provided with a connecting hole, the second connecting portion is provided with a connecting pin, and the first connecting portion is connected with the second connecting portion by inserting the connecting pin into the connecting hole.

4. The drive device as claimed in claim 1, wherein the open-and-close transmission clutch includes an open-and-close transmission teeth portion, an open-and-close transmission clutch teeth portion and an open-and-close transmission elastic element, the open-and-close transmission teeth portion is provided at one end of the open-and-close transmission rod, the open-and-close transmission clutch teeth portion is connected with the open-and-close transmission output joint by the open-and-close transmission elastic element, and the open-and-close transmission elastic element biases the open-and-close transmission clutch teeth portion so that the open-and-close transmission clutch teeth portion is engaged with the open-and-close transmission teeth portion, and thereby the open-and-close transmission output joint axially rotates in the horizontal direction along with the open-and-close transmission rod, and wherein the angle transmission clutch includes an angle transmission teeth portion, an angle transmission clutch teeth portion and an angle transmission elastic element, the angle transmission teeth portion is provided at one end of the angle transmission rod, the angle transmission clutch teeth portion is connected with the angle transmission output joint by the angle transmission elastic element, and the angle transmission elastic element biases the angle transmission clutch teeth portion so that the angle transmission clutch teeth portion is engaged with the angle transmission teeth portion, and thereby the angle transmission output joint axially rotates in the horizontal direction along with the angle transmission rod.

5. The drive device as claimed in claim 4, wherein the clutch switching component includes an open-and-close transmission clutch slider and an angle transmission clutch slider, wherein the open-and-close transmission clutch slider is connected with the open-and-close transmission clutch teeth portion to control the open-and-close transmission clutch to be switched between the engaged state and the disengaged state, the angle transmission clutch slider is connected with the angle transmission clutch teeth portion to control the angle transmission clutch to be switched between the engaged state and the disengaged state, wherein in the first switching position, the open-and-close transmission clutch slider slides horizontally without resisting a biasing force of the open-and-close transmission elastic element so that the open-and-close transmission clutch teeth portion is engaged with the open-and-close transmission teeth portion, thereby switching the open-and-close transmission clutch to the engaged state, and at the same time, the angle transmission clutch slider slides horizontally while resisting a biasing force of the angle transmission elastic element so that the angle transmission clutch teeth portion is disengaged from the angle transmission teeth portion, thereby switching the angle transmission clutch to the disengaged state, and wherein in the second switching position, the open-and-close transmission clutch slider slides horizontally while resisting the biasing force of the open-and-close transmission elastic element so that the open-and-close transmission clutch teeth portion is disengaged from the open-and-close transmission teeth portion, thereby switching the open-and-close transmission clutch to the disengaged state, and at the same time, the angle transmission clutch slider slides horizontally without resisting the biasing force of the angle transmission elastic element so that the angle transmission clutch teeth portion is engaged with the angle transmission teeth portion, thereby switching the angle transmission clutch to the engaged state.

6. The drive device as claimed in claim 1, wherein the clutch switching component further has an interconnecting element connected with the driving connecting rod, the first connecting portion of the driving connecting rod is slidably connected with the second connecting portion of the driving screw rod so that the driving connecting rod is slidable in the vertical direction between a first vertical position and a second vertical position with respect to the driving screw rod, wherein as the driving connecting rod slides in the vertical direction to the first vertical position, the clutch switching component is driven by the driving connecting rod via the interconnecting element to switch to the first switching position, and as the driving connecting rod slides in the vertical direction to the second vertical position, the clutch switching component is driven by the driving connecting rod via the interconnecting element to switch to the second switching position.

7. The drive device as claimed in claim 5, wherein the clutch switching component further has an interconnecting element connected with the driving connecting rod, the first connecting portion of the driving connecting rod is slidably connected with the second connecting portion of the driving screw rod so that the driving connecting rod is slidable in the vertical direction between a first vertical position and a second vertical position with respect to the driving screw rod, wherein as the driving connecting rod slides in the vertical direction to the first vertical position, the clutch switching component is driven by the driving connecting rod via the interconnecting element to switch to the first switching position, and as the driving connecting rod slides in the vertical direction to the second vertical position, the clutch switching component is driven by the driving connecting rod via the interconnecting element to switch to the second switching position.

* * * * *